United States Patent
Lin et al.

(10) Patent No.: US 9,955,365 B2
(45) Date of Patent: Apr. 24, 2018

(54) CONDITIONAL PROGRESSIVE ENCODING AND DECODING

(71) Applicant: QUALCOMM Incorporated, San Diego, CA (US)

(72) Inventors: Jamie Menjay Lin, San Diego, CA (US); Jing Jiang, San Diego, CA (US); Peter Pui Lok Ang, San Diego, CA (US); Tingfang Ji, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 258 days.

(21) Appl. No.: 14/945,143

(22) Filed: Nov. 18, 2015

(65) Prior Publication Data
US 2016/0309343 A1    Oct. 20, 2016

Related U.S. Application Data

(60) Provisional application No. 62/147,971, filed on Apr. 15, 2015.

(51) Int. Cl.
*H04L 12/26* (2006.01)
*H04W 24/02* (2009.01)
(Continued)

(52) U.S. Cl.
CPC .......... *H04W 24/02* (2013.01); *H04L 1/0007* (2013.01); *H04L 1/0038* (2013.01); *H04L 65/60* (2013.01)

(58) Field of Classification Search
CPC .................... H04L 1/04; H04L 5/00
See application file for complete search history.

(56) References Cited

U.S. PATENT DOCUMENTS 5,471,503 A * 11/1995 Altmaier ............... H04B 1/713
                                                                375/133
5,741,314 A *  4/1998 Daly .................. A61N 1/37223
                                                                128/903
(Continued)

FOREIGN PATENT DOCUMENTS

EP          1811711 A1    7/2007
WO    WO-2014133926 A1    9/2014

OTHER PUBLICATIONS

"3 Generation Partnership Project; Technical Specification Group Radio Access Network; Evolved Universal Terrestrial Radio Access (E-UTRA); Multiplexing and Channel Coding (Release 12)", 3GPP Standard; 3GPP TS 36.212, 3rd Generation Partnership Project (3GPP), Mobile Competence Centre; 650, Route Des Lucioles; F-06921 Sophia-Antipolis Cedex; France, vol. RAN WG1, No. V12.4.0, Mar. 18, 2015 (Mar. 18, 2015), pp. 1-94, XP050928084, [retrieved on Mar. 18, 2015].

(Continued)

*Primary Examiner* — Kevin C Harper
(74) *Attorney, Agent, or Firm* — Qualcomm IP Dept.; James Hunt Yancey, Jr.

(57) ABSTRACT

Conditional progressive encoding and decoding is discussed, in which a receiver receives a plurality of encoded message segments as a sequence of messages, and sequentially decodes each of the message segments in sequence, in which the decoding of the next encoded message segment is triggered only by successfully decoding the current encoded message segment. On the transmitter side, the transmitter breaks a message payload into a sequence of message segments, and then independently processes each message segment for generating error detection coding and encoding into multiple codeword segments. The transmitter multi- (Continued)

plexes each codeword segment over the spectral space of subcarriers to transmit the message.

40 Claims, 7 Drawing Sheets

(51) Int. Cl.
*H04L 29/06* (2006.01)
*H04L 1/00* (2006.01)

(56) References Cited

U.S. PATENT DOCUMENTS

| | | | |
|---|---|---|---|
| 7,502,987 B2 | 3/2009 | Kyung et al. | |
| 8,520,610 B2 | 8/2013 | Lee et al. | |
| 8,867,565 B2 | 10/2014 | Van et al. | |
| 2006/0045130 A1* | 3/2006 | Kim | H04L 1/16 370/469 |
| 2009/0175243 A1* | 7/2009 | Han | H04B 7/12 370/335 |
| 2009/0245426 A1 | 10/2009 | Ratnakar et al. | |
| 2009/0249155 A1 | 10/2009 | Mayrench et al. | |
| 2012/0159282 A1 | 6/2012 | Ito | |
| 2014/0086145 A1 | 3/2014 | Ramkumar et al. | |
| 2014/0146756 A1 | 5/2014 | Sahin et al. | |

OTHER PUBLICATIONS

"3rd Generation Partnership Project; Technical Specification Group Radio Access Network; Multiplexing and channel coding (TDD)(Release 6)", 3GPP Draft; R1-051523, 3rd Generation Partnership Project (3GPP), Mobile Competence Centre; 650, Route Des Lucioles; F-06921 Sophia-Antipolis Cedex; France, vol. RAN WG1, No. Seoul, Korea; Nov. 1, 2005, Nov. 1, 2005 (Nov. 1, 2005), XP050101097, [retrieved on Nov. 1, 2005].
International Search Report and Written Opinion—PCT/US2016/020179—ISA/EPO—dated Jun. 1, 2016.

* cited by examiner

CONDITIONAL PROGRESSIVE ENCODING AND DECODING

CROSS-REFERENCE TO RELATED APPLICATIONS

This application claims the benefit of U.S. Provisional Patent Application No. 62/147,971, entitled, "CONDITIONAL PROGRESSIVE ENCODING AND DECODING," filed on Apr. 15, 2015, which is expressly incorporated by reference herein in its entirety.

BACKGROUND

Field

Aspects of the present disclosure relate generally to wireless communication systems, and more particularly, to conditional progressive encoding and decoding in wireless systems.

Background

Wireless communication networks are widely deployed to provide various communication services such as voice, video, packet data, messaging, broadcast, and the like. These wireless networks may be multiple-access networks capable of supporting multiple users by sharing the available network resources. Such networks, which are usually multiple access networks, support communications for multiple users by sharing the available network resources. One example of such a network is the Universal Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). Examples of multiple-access network formats include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations or node Bs that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance the UMTS technologies not only to meet the growing demand for mobile broadband access, but to advance and enhance the user experience with mobile communications.

SUMMARY

In one aspect of the disclosure, a method of wireless communication includes receiving a plurality of encoded message segments, and sequentially decoding the plurality of encoded message segments, wherein decoding a next encoded message segment of the plurality of encoded message segments is triggered by successfully decoding a current encoded message segment of the plurality.

In an additional aspect of the disclosure, a method of wireless communication includes dividing a message for transmission into a sequence of message segments, independently generating an error detection code for each message segment of the sequence of message segments, independently encoding each message segment into a codeword segment, multiplexing the codeword segments for the sequence of message segments over a spectral space of a plurality of subcarriers for the transmitting, and transmitting each codeword segment for the sequence of message segments.

In an additional aspect of the disclosure, an apparatus configured for wireless communication includes means for receiving a plurality of encoded message segments, and means for sequentially decoding the plurality of encoded message segments, wherein decoding a next encoded message segment of the plurality of encoded message segments is triggered by successfully decoding a current encoded message segment of the plurality.

In an additional aspect of the disclosure, an apparatus configured for wireless communication includes means for dividing a message for transmission into a sequence of message segments, means for independently generating an error detection code for each message segment of the sequence of message segments, means for independently encoding each message segment into a codeword segment, means for multiplexing the codeword segments for the sequence of message segments over a spectral space of a plurality of subcarriers for transmission, and means for transmitting each codeword segment for the sequence of message segments.

In an additional aspect of the disclosure, a non-transitory computer-readable medium having program code recorded thereon. The program code further includes code to receive a plurality of encoded message segments, and code to sequentially decode the plurality of encoded message segments, wherein decoding a next encoded message segment of the plurality of encoded message segments is triggered by successfully decoding a current encoded message segment of the plurality.

In an additional aspect of the disclosure, a non-transitory computer-readable medium having program code recorded thereon. The program code further includes code to divide a message for transmission into a sequence of message segments, code to independently generate an error detection code for each message segment of the sequence of message segments, code to independently encode each message segment into a codeword segment, code to multiplex the codeword segments for the sequence of message segments over a spectral space of a plurality of subcarriers for transmission, and code to transmit each codeword segment for the sequence of message segments.

In an additional aspect of the disclosure, an apparatus configured for wireless communication is disclosed. The apparatus includes at least one processor, and a memory coupled to the processor. The processor is configured to receive a plurality of encoded message segments, and to sequentially decode the plurality of encoded message segments, wherein decoding a next encoded message segment of the plurality of encoded message segments is triggered by successfully decoding a current encoded message segment of the plurality.

In an additional aspect of the disclosure, an apparatus configured for wireless communication is disclosed. The apparatus includes at least one processor, and a memory coupled to the processor. The processor is configured to divide a message for transmission into a sequence of message segments, to independently generate an error detection code for each message segment of the sequence of message segments, to independently encode each message segment into a codeword segment, to multiplex the codeword segments for the sequence of message segments over a spectral space of a plurality of subcarriers for transmission, and to transmit each codeword segment for the sequence of message segments.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

DETAILED DESCRIPTION

Figure 1:
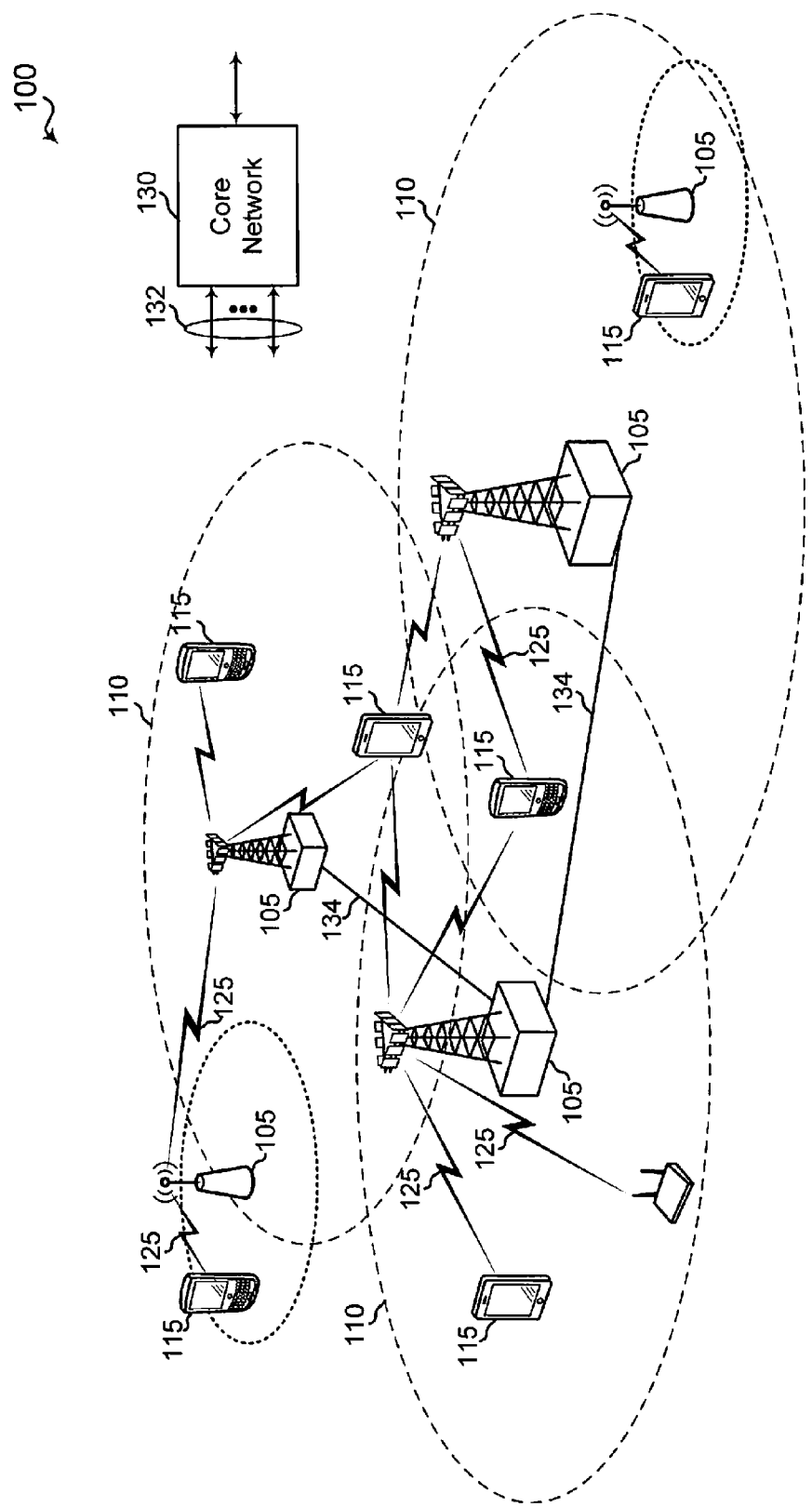
FIG. 1 is a block diagram illustrating details of a wireless communication system.

The detailed description set forth below, in connection with the appended drawings, is intended as a description of various possible configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

This disclosure relates generally to providing or participating in authorized shared access between two or more wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, as well as other communications networks. As described herein, the terms "networks" and "systems" may be used interchangeably.

A CDMA network may implement a radio technology such as universal terrestrial radio access (UTRA), cdma2000, and the like. UTRA includes wideband-CDMA (W-CDMA) and low chip rate (LCR). CDMA2000 covers IS-2000, IS-95, and IS-856 standards.

A TDMA network may implement a radio technology such as Global System for Mobile Communications (GSM). 3GPP defines standards for the GSM EDGE (enhanced data rates for GSM evolution) radio access network (RAN), also denoted as GERAN. GERAN is the radio component of GSM/EDGE, together with the network that joins the base stations (for example, the Ater and Abis interfaces) and the base station controllers (A interfaces, etc.). The radio access network represents a component of a GSM network, through which phone calls and packet data are routed from and to the public switched telephone network (PSTN) and Internet to and from subscriber handsets, also known as user terminals or user equipments (UEs). A mobile phone operator's network may comprise one or more GERANs, which may be coupled with UTRANs in the case of a UMTS/GSM network. An operator network may also include one or more LTE networks, and/or one or more other networks. The various different network types may use different radio access technologies (RATs) and radio access networks (RANs).

An OFDMA network may implement a radio technology such as evolved UTRA (E-UTRA), IEEE 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project aimed at improving the universal mobile telecommunications system (UMTS) mobile phone standard. The 3GPP may define specifications for the next generation of mobile networks, mobile systems, and mobile devices. For clarity, certain aspects of the apparatus and techniques may be described below for LTE implementations or in an LTE-centric way, and LTE terminology may be used as illustrative examples in portions of the description below; however, the description is not intended to be limited to LTE applications. Indeed, the present disclosure is concerned with shared access to wireless spectrum between networks using different radio access technologies or radio air interfaces.

A new carrier type based on LTE/LTE-A including in unlicensed spectrum has also been suggested that can be compatible with carrier-grade WiFi, making LTE/LTE-A with unlicensed spectrum an alternative to WiFi. LTE/LTE-A, when operating in unlicensed spectrum, may leverage LTE concepts and may introduce some modifications to physical layer (PHY) and media access control (MAC) aspects of the network or network devices to provide efficient operation in the unlicensed spectrum and meet regulatory requirements. The unlicensed spectrum used may range from as low as several hundred Megahertz (MHz) to as high as tens of Gigahertz (GHz), for example. In operation, such LTE/LTE-A networks may operate with any combination of licensed or unlicensed spectrum depending on loading and availability. Accordingly, it may be apparent to one of skill in the art that the systems, apparatus and methods described herein may be applied to other communications systems and applications.

System designs may support various time-frequency reference signals for the downlink and uplink to facilitate beamforming and other functions. A reference signal is a signal generated based on known data and may also be referred to as a pilot, preamble, training signal, sounding signal, and the like. A reference signal may be used by a receiver for various purposes such as channel estimation, coherent demodulation, channel quality measurement, signal strength measurement, and the like. MIMO systems using multiple antennas generally provide for coordination of sending of reference signals between antennas; however, LTE systems do not in general provide for coordination of sending of reference signals from multiple base stations or eNBs.

In some implementations, a system may utilize time division duplexing (TDD). For TDD, the downlink and uplink share the same frequency spectrum or channel, and downlink and uplink transmissions are sent on the same frequency spectrum. The downlink channel response may thus be correlated with the uplink channel response. Reciprocity may allow a downlink channel to be estimated based on transmissions sent via the uplink. These uplink transmissions may be reference signals or uplink control channels (which may be used as reference symbols after demodulation). The uplink transmissions may allow for estimation of a space-selective channel via multiple antennas.

In LTE implementations, orthogonal frequency division multiplexing (OFDM) is used for the downlink—that is, from a base station, access point or eNodeB (eNB) to a user terminal or UE. Use of OFDM meets the LTE requirement for spectrum flexibility and enables cost-efficient solutions for very wide carriers with high peak rates, and is a well-established technology. For example, OFDM is used in standards such as IEEE 802.11a/g, 802.16, High Performance Radio LAN-2 (HIPERLAN-2, wherein LAN stands for Local Area Network) standardized by the European Telecommunications Standards Institute (ETSI), Digital Video Broadcasting (DVB) published by the Joint Technical Committee of ETSI, and other standards.

Time frequency physical resource blocks (also denoted here in as resource blocks or "RBs" for brevity) may be defined in OFDM systems as groups of transport carriers (e.g. sub-carriers) or intervals that are assigned to transport data. The RBs are defined over a time and frequency period. Resource blocks are comprised of time-frequency resource elements (also denoted here in as resource elements or "REs" for brevity), which may be defined by indices of time and frequency in a slot. Additional details of LTE RBs and REs are described in the 3GPP specifications, such as, for example, 3GPP TS 36.211.

UMTS LTE supports scalable carrier bandwidths from 20 MHz down to 1.4 MHZ. In LTE, an RB is defined as 12 sub-carriers when the subcarrier bandwidth is 15 kHz, or 24 sub-carriers when the sub-carrier bandwidth is 7.5 kHz. In an exemplary implementation, in the time domain there is a defined radio frame that is 10 ms long and consists of 10 subframes of 1 millisecond (ms) each. Every subframe consists of 2 slots, where each slot is 0.5 ms. The subcarrier spacing in the frequency domain in this case is 15 kHz. Twelve of these subcarriers together (per slot) constitute an RB, so in this implementation one resource block is 180 kHz. Six Resource blocks fit in a carrier of 1.4 MHz and 100 resource blocks fit in a carrier of 20 MHz.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

FIG. 1 shows a wireless network 100 for communication, which may be an LTE-A network. The wireless network 100 includes a number of evolved node Bs (eNBs) 110 and other network entities. An eNB may be a station that communicates with the UEs and may also be referred to as a base station, a node B, an access point, and the like. Each eNB 110 may provide communication coverage for a particular geographic area. In 3GPP, the term "cell" can refer to this particular geographic coverage area of an eNB and/or an eNB subsystem serving the coverage area, depending on the context in which the term is used.

An eNB may provide communication coverage for a macro cell, a pico cell, a femto cell, and/or other types of cell. A macro cell generally covers a relatively large geographic area (e.g., several kilometers in radius) and may allow unrestricted access by UEs with service subscriptions with the network provider. A pico cell would generally cover a relatively smaller geographic area and may allow unrestricted access by UEs with service subscriptions with the network provider. A femto cell would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). An eNB for a macro cell may be referred to as a macro eNB. An eNB for a pico cell may be referred to as a pico eNB. And, an eNB for a femto cell may be referred to as a femto eNB or a home eNB. In the example shown in FIG. 1, the eNBs 110a, 110b and 110c are macro eNBs for the macro cells 102a, 102b and 102c, respectively. The eNB 110x is a pico eNB for a pico cell 102x. And, the eNBs 110y and 110z are femto eNBs for the femto cells 102y and 102z, respectively. An eNB may support one or multiple (e.g., two, three, four, and the like) cells.

The wireless network 100 also includes relay stations. A relay station is a station that receives a transmission of data and/or other information from an upstream station (e.g., an eNB, a UE, or the like) and sends a transmission of the data and/or other information to a downstream station (e.g., another UE, another eNB, or the like). A relay station may also be a UE that relays transmissions for other UEs. In the example shown in FIG. 1, a relay station 110r may communicate with the eNB 110a and a UE 120r, in which the relay station 110r acts as a relay between the two network elements (the eNB 110a and the UE 120r) in order to facilitate communication between them. A relay station may also be referred to as a relay eNB, a relay, and the like.

The wireless network 100 may support synchronous or asynchronous operation. For synchronous operation, the eNBs may have similar frame timing, and transmissions from different eNBs may be approximately aligned in time. For asynchronous operation, the eNBs may have different frame timing, and transmissions from different eNBs may not be aligned in time.

The UEs 120 are dispersed throughout the wireless network 100, and each UE may be stationary or mobile. A UE may also be referred to as a terminal, a mobile station, a subscriber unit, a station, or the like. A UE may be a cellular phone, a personal digital assistant (PDA), a wireless modem, a wireless communication device, a handheld device, a tablet computer, a laptop computer, a cordless phone, a wireless local loop (WLL) station, or the like. A UE may be able to communicate with macro eNBs, pico eNBs, femto eNBs, relays, and the like. In FIG. 1, a solid line with double arrows indicates desired transmissions between a UE and a serving eNB, which is an eNB designated to serve the UE on the downlink and/or uplink. A dashed line with double arrows indicates interfering transmissions between a UE and an eNB.

LTE/-A utilizes orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, or the like. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, K may be equal to 72, 180, 300, 600, 900, and 1200 for a corresponding system bandwidth of 1.4, 3, 5, 10, 15, or 20 megahertz (MHz), respectively. The system bandwidth may also be partitioned into sub-bands. For example, a sub-band may cover 1.08 MHz, and there may be 1, 2, 4, 8 or 16 sub-bands for a corresponding system bandwidth of 1.4, 3, 5, 10, 15, or 20 MHz, respectively.

Figure 2:
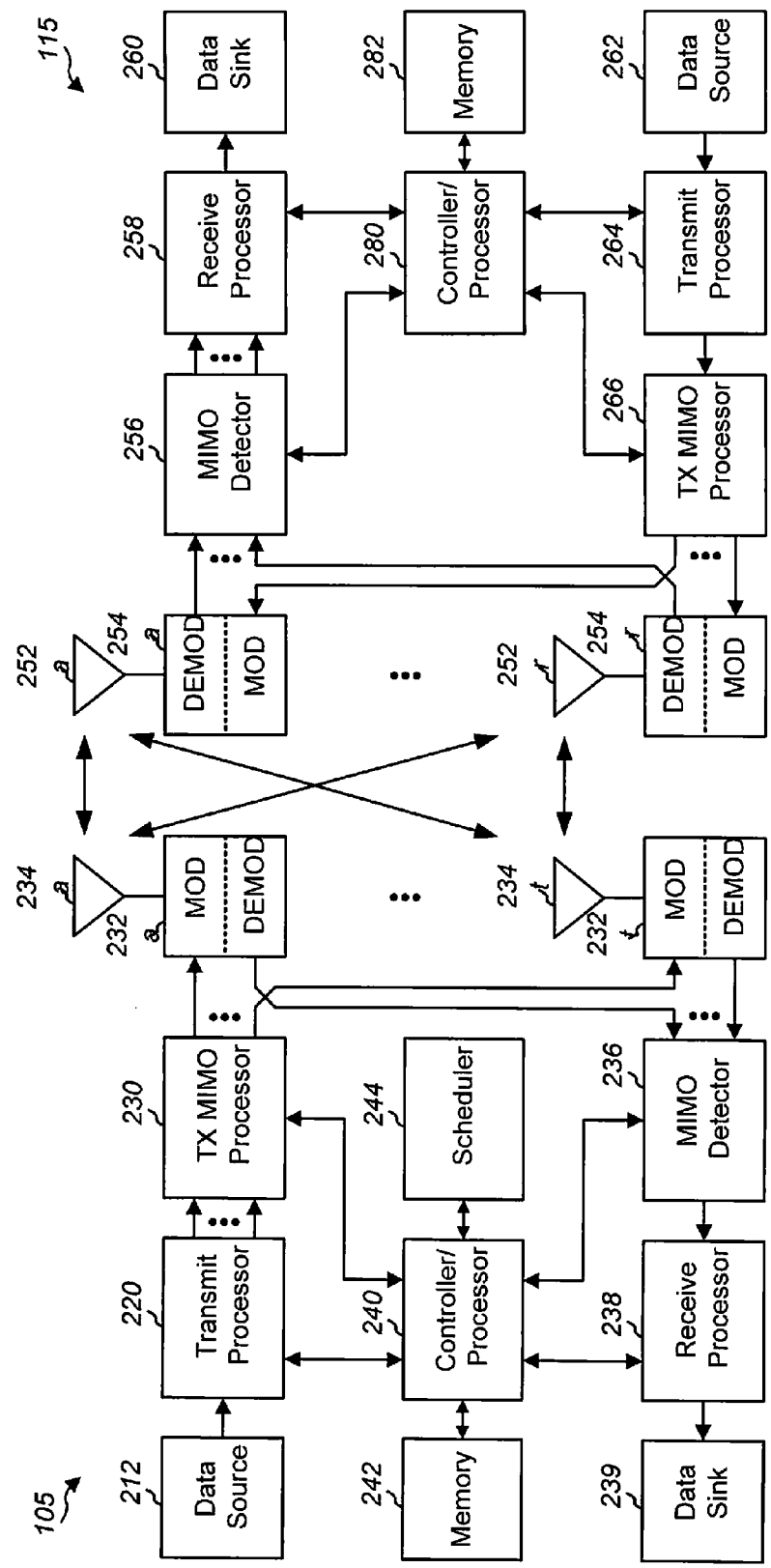
FIG. 2 is a block diagram illustrating a design of a base station/eNB and a UE configured according to one aspect of the present disclosure.

FIG. 2 shows a block diagram of a design of a base station/eNB 110 and a UE 120, which may be one of the base stations/eNBs and one of the UEs in FIG. 1. For a restricted association scenario, the eNB 110 may be the macro eNB 110c in FIG. 1, and the UE 120 may be the UE 120y. The eNB 110 may also be a base station of some other type. The eNB 110 may be equipped with antennas 234a through 234t, and the UE 120 may be equipped with antennas 252a through 252r.

At the eNB 110, a transmit processor 220 may receive data from a data source 212 and control information from a controller/processor 240. The control information may be for the PBCH, PCFICH, PHICH, PDCCH, etc. The data may be for the PDSCH, etc. The transmit processor 220 may process (e.g., encode and symbol map) the data and control information to obtain data symbols and control symbols, respectively. The transmit processor 220 may also generate reference symbols, e.g., for the PSS, SSS, and cell-specific reference signal. A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232a through 232t. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. Downlink signals from modulators 232a through 232t may be transmitted via the antennas 234a through 234t, respectively.

At the UE 120, the antennas 252a through 252r may receive the downlink signals from the eNB 110 and may provide received signals to the demodulators (DEMODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. A MIMO detector 256 may obtain received symbols from all the demodulators 254a through 254r, perform MIMO detection on the received symbols if applicable, and provide detected symbols. A receive processor 258 may process (e.g., demodulate, deinterleave, and decode) the detected symbols, provide decoded data for the UE 120 to a data sink 260, and provide decoded control information to a controller/processor 280.

On the uplink, at the UE 120, a transmit processor 264 may receive and process data (e.g., for the PUSCH) from a data source 262 and control information (e.g., for the PUCCH) from the controller/processor 280. The transmit processor 264 may also generate reference symbols for a reference signal. The symbols from the transmit processor 264 may be precoded by a TX MIMO processor 266 if applicable, further processed by the modulators 254a through 254r (e.g., for SC-FDM, etc.), and transmitted to the eNB 110. At the eNB 110, the uplink signals from the UE 120 may be received by the antennas 234, processed by the demodulators 232, detected by a MIMO detector 236 if applicable, and further processed by a receive processor 238 to obtain decoded data and control information sent by the UE 120. The processor 238 may provide the decoded data to a data sink 239 and the decoded control information to the controller/processor 240.

The controllers/processors 240 and 280 may direct the operation at the eNB 110 and the UE 120, respectively. The controller/processor 240 and/or other processors and modules at the eNB 110 may perform or direct the execution of various processes for the techniques described herein. The controllers/processor 280 and/or other processors and modules at the UE 120 may also perform or direct the execution of the functional blocks illustrated in FIGS. 5-7, and/or other processes for the techniques described herein. The memories 242 and 282 may store data and program codes for the eNB 110 and the UE 120, respectively. A scheduler 244 may schedule UEs for data transmission on the downlink and/or uplink.

Current LTE standards provide for a large number of blind decoding hypotheses. The large number of blind decoding increases decoding complexity and latency. Additionally, current LTE standards provide for little or no support for variable or arbitrary length signaling and decoding. Under current standards, downlink control indicator (DCI) formats have fixed lengths. Moreover, DCI allocation types 0/1/2 also use fixed pre-defined bitmap lengths. Such excessive blind decoding and failure to support variable or arbitrary length signaling may create problems in implementing many of the contemplated new features of fifth generation (5G) networks. For example, 5G signaling contemplates dynamic scheduling priorities with high priority users, or users with a higher required quality of service (QoS). This dynamic scheduling may include variable length signaling priority indication (SPI). Additionally, implementation of carrier aggregation may include a variable number of carriers with potentially variable-length DCI signaling. Further, the increasing numbers and types of devices accessing wireless networks may be supported with resource block (RB) allocation also having potentially variable-length DCI. Thus, as levels of services expand (e.g., high priority users), the number of carriers increases (e.g., carrier aggregation), and the types of devices grow, the practice of signaling/decoding always only at pre-defined signal lengths is facing challenges and inflexibility, and, as such, is imposing limitations in future system design.

Figure 3:
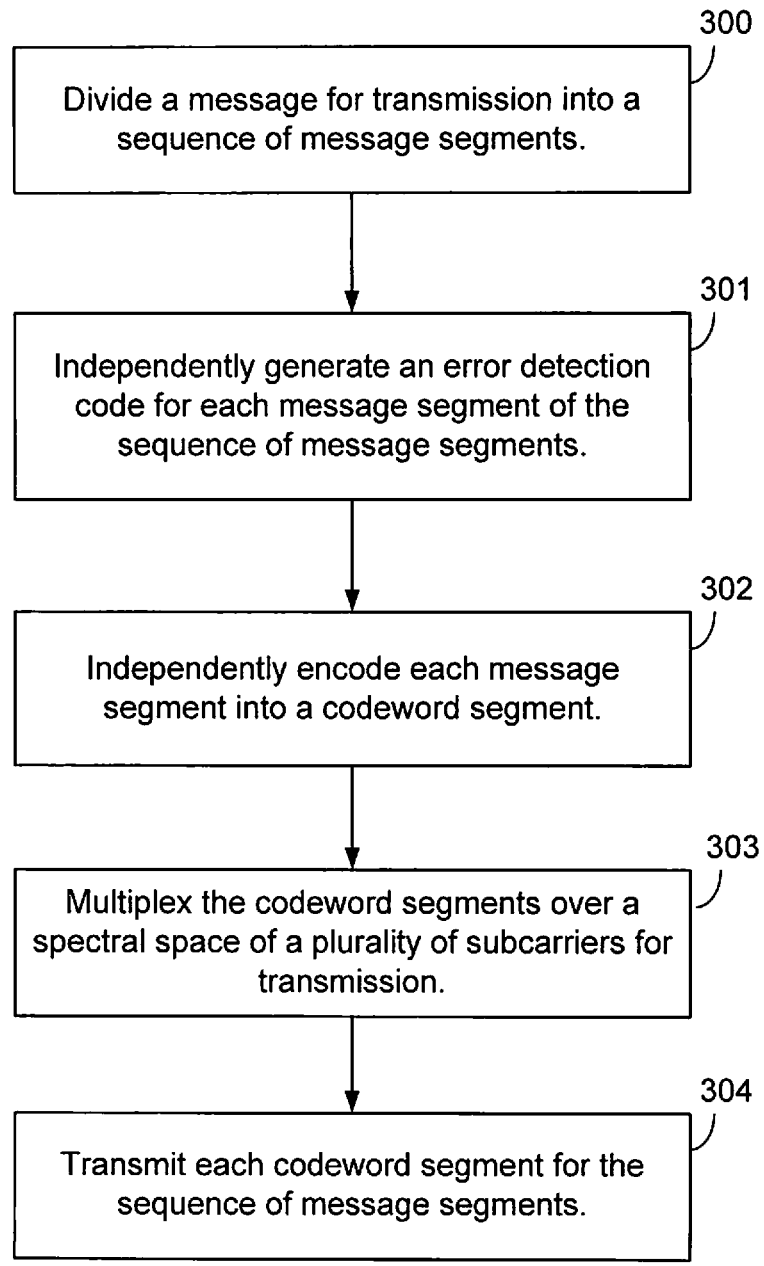
FIG. 3 is a block diagram illustrating example blocks executed to implement one aspect of the present disclosure from the transmitter or encoding side.

Various aspects of the present disclosure are directed to providing conditional progressive signaling and decoding (CPS/D). FIG. 3 is a block diagram illustrating example blocks executed to implement one aspect of the present disclosure from the transmitter or encoding side (CPS). At block 300, a message for transmission is divided into a sequence of message segments. When the transmitter has data that is to be transmitted to a receiver, a single piece of that message payload may be broken into a sequence of multiple segments.

At block 301, an error detection code is independently generated for each message segment of the sequence of message segments. For example, parity codes (e.g., cyclic redundancy check (CRC) codes) may be independently generated for each message segment independently of one another.

At block 302, each message segment is independently encoded into a codeword segment. The entire segment, with payload and the error detection code is independently encoded into one codeword segment.

At block 303, each of the codeword segments are multiplexed over a spectral space of a plurality of subcarriers for transmission. The multiplexing of the codeword segments allows the transmitter to transmit the encoded sequence of message segments concurrently. At block 304 each codeword segment of the sequence is transmitted to the receiver entity. Thus, the various aspects of the present disclosure provide for the transmitter to divide individual messages for transmission into a sequence of a plurality of message segments which are then both independently processed for error detection coding and independently encoded into single codeword segments and then multiplexed over the subcarrier resources for concurrent transmission to the receiving network entity.

Figure 4:
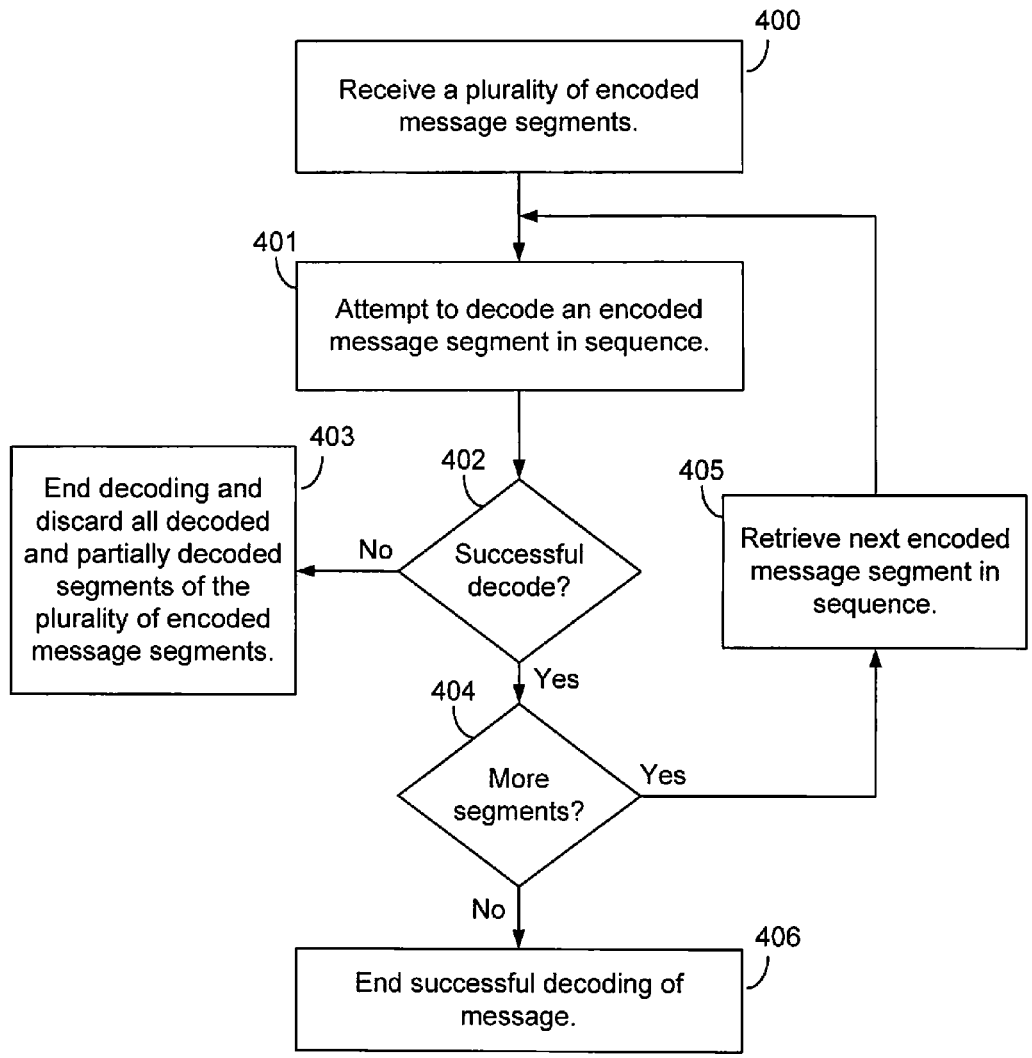
FIG. 4 is a block diagram illustrating example blocks executed to implement one aspect of the present disclosure from the receiver or decoding entity.

Additional aspects of the present disclosure are directed to providing a conditional progressive decoding (CPD) on the receiver or decoding side. FIG. 4 is a block diagram illustrating example blocks executed to implement one aspect of the present disclosure from the receiver or decoding entity. At block 400, a receiver receives a plurality of encoded message segments. The receiver receives the sequence of codeword segments as transmitted by a transmitter operating CPS, as described with respect to FIG. 3.

At block 401, the receiver attempts to decode an encoded message segment in sequence. For example, starting with the first codeword segment, the receiver attempts to progressively decode the first codeword segment of the received encoded message segments.

At block 402, a determination is made whether the first codeword segment has been successfully decoded. If not, then, at block 403, the receiver ends the decoding of the received plurality of encoded message segments and discards all decoded or partially decoded segments, if the failure to decode occurs after the first one or more messages are successfully or partially successfully decoded.

Otherwise, if the first codeword segment has been successfully decoded, then, at block 404, a determination is made whether there are any more encoded message segments left to decode. If not, then, at block 406, the receiver ends successfully decoding the transmitted message by successfully decoding all of the plurality of encoded message segments received. If additional encoded message segments remain for decoding, then, at block 405, the receiver retrieves the next encoded message segment in the sequence, and attempts to decode this next message segment at block 401. Thus, the receiver attempts to decode a subsequent segment of the sequence only upon the condition that the previous segment is successfully decoded, passing all associated parity checks, and the like. Blocks 401, 402, and 404 are repeated until either one of the segments fails to decode, in which the ending and discarding is triggered at block 403, additional segments are decoded in sequence at block 405, or all segments are successfully decoded, at block 406. The entire process described in FIG. 4, is repeated conditionally and progressively over the entire sequence. If all segments pass associated parity checks, decoding for the entire sequence is deemed successful.

It should be noted that the CPS/D functionality and features may be used for various difference channels, such as DCI, PDCCH, uplink control indicator (UCI), and the like. The functionality of CPS/D is not limited to any specific channel or transmission.

It should further be noted that the various aspects of the present disclosure incorporating CPS/D are not limited to any particular channel coding scheme or error detection coding scheme. The various aspects of the present disclosure incorporating CPS/D may use any type of coding such as CRC (for error detection coding), or convolutional code, tail-biting convolution code, Reed-Muller code, or another code for encoding the message segments.

Additional aspects of the present disclosure include support for variable/arbitrary length signaling by embedding size or progression information into the transmission segments. For example, the size information may be provided initially, either by including a total message size in a first segment or by configuring a number of fixed-size segments with information on a variable size of the final segment. Size may also be signaled for the next segment in the current segment. Additionally, if fixed size segments are used, a progression indicator bit may be included in each segment when another segment is available or expected in the sequence.

Figure 5A:
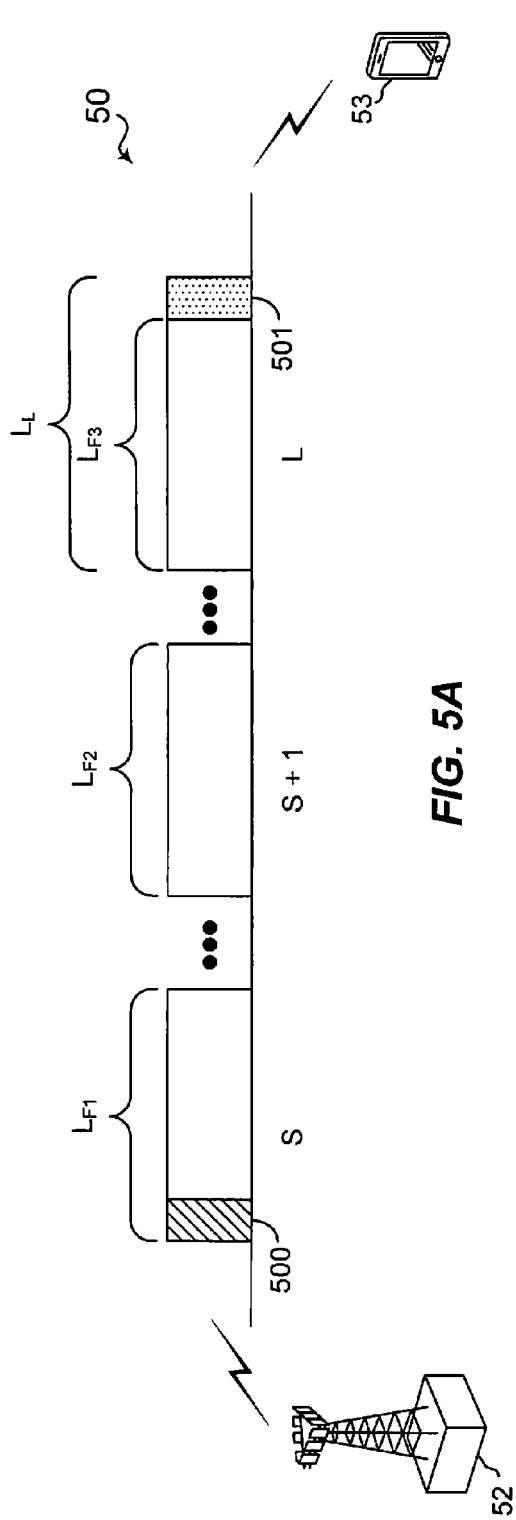
FIGS. 5A and 5B are block diagrams illustrating sequences of message segments communicated between a transmitter and a receiver configured according to one aspect of the present disclosure.

FIG. 5A is a block diagram illustrating a sequence of message segments 50 communicated between a transmitter 52 and a receiver 53 configured according to one aspect of the present disclosure. Transmitter 52 may be a base station, such as base station 105 (FIG. 2), when the base station is transmitting data, or may be a UE, such as UE 115 (FIG. 2), when the UE is transmitting data. Similarly, receiver 53 may be a UE, such as UE 115, when the UE is receiving transmitted data, or may be a base station, such as base station 105, when the base station is receiving transmitted data. Transmitter 52 and receiver 53 may, thus, include the components and functionality described with respect to base station 105 and UE 115, respectively, when operating as a transmitter or receiver. Transmitter 52 divides a message payload into the sequence of message segments 50 having three message segments, message segments S, S+1, and L. Before transmitting the sequence of message segments 50, transmitter 52, as described above with respect to FIG. 3, independently generates error detection codes for message segments S, S+1, and L, and then independently encodes message segments S, S+1, and L. In the first transmitted segment, message segment S, transmitter 50 includes an embedded size indicator 500. As illustrated in FIG. 5A, embedded size indicator 500 provides size information about the sequence of message segments 50. For example, embedded size indicator 500 may indicate the total size for all of the sequence of message segments 50. When received by receiver 53, receiver 53 will know when the sequence of message segments 50 is complete. In one example size, if embedded size indicator 500 indicates the total message size of the sequence of message segments 50 is 50 bits, the sum of $L_{F1}+L_{F2}+L_L$ will be 50 bits.

In another example aspect illustrated by FIG. 5A, embedded size indicator may provide for a number of fixed-size segments followed by the total size, $L_L$, of the last message segment, message segment L. In such example aspect, the sizes of message segments S and S+1, $L_{F1}$ and $L_{F2}$, are the same. The last segment, message segment L, includes an additional number of bits 501 over the fixed size $L_{F3}$.

Figure 5B:
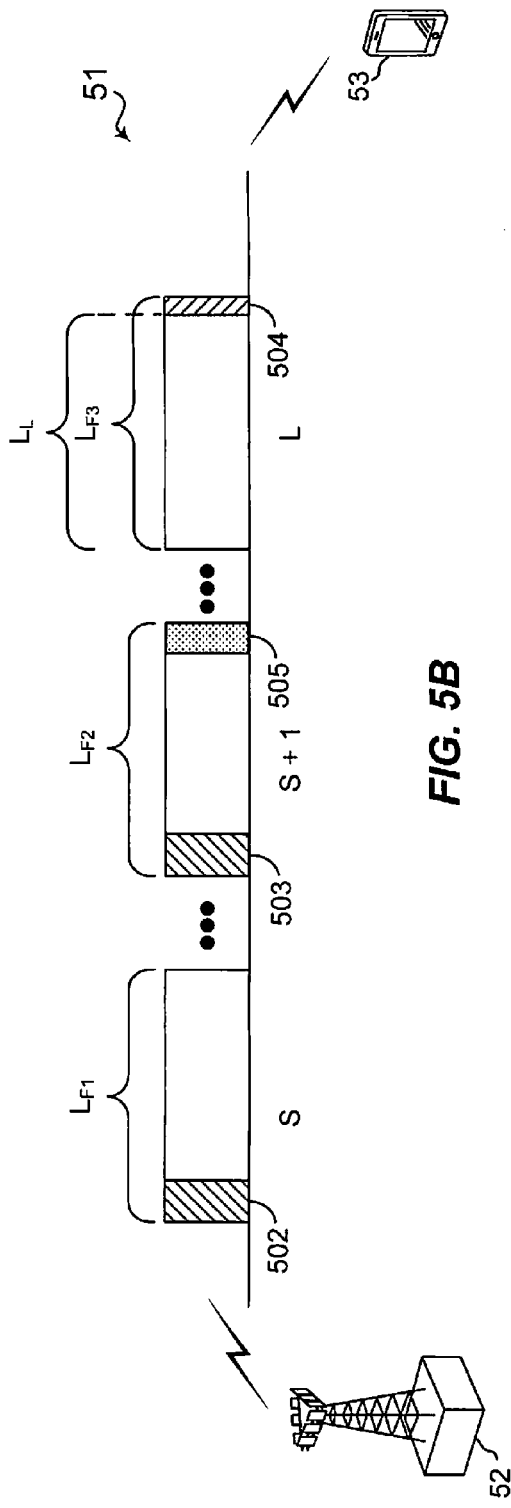

FIG. 5B is a block diagram illustrating a sequence of message segments 50 communicated between a transmitter 52 and a receiver 53 configured according to one aspect of the present disclosure. Transmitter 52 may be a base station, such as base station 105 (FIG. 2), when the base station is transmitting data, or may be a UE, such as UE 115 (FIG. 2), when the UE is transmitting data. Similarly, receiver 53 may be a UE, such as UE 115, when the UE is receiving transmitted data, or may be a base station, such as base station 105, when the base station is receiving transmitted data. As noted with regard to FIG. 5B, transmitter 52 divides the message payload into the sequence of message segments 51, with message segments S, S+1, and L. In one example aspect illustrated in FIG. 5B, transmitter 52 includes embedded size indicators 502 and 503. Embedded size indicators 502 and 503 provide size information for the following message segment. Thus, embedded size indicator 502 provides the size information, $L_{F2}$, for message segment S+1, and embedded size indicator 503 provides the size information, $L_L$, for the last message segment, message segment L. By providing size information about the following message segment, aspects of the present disclosure may include different sizes for each message segment, such that $L_{F1}$, $L_{F2}$, and $L_L$ may each have different sizes.

In another example aspect illustrated by FIG. 5B, embedded size indicators 502 and 503 may include a progression indicator bit that indicates to receiver 53 to continue decoding message segments. In such example aspect, message segments S and S+1 are of a fixed-size, such that $L_{F1}=L_{F2}$. The last segment, message segment L, may have a different size also indicated either in embedded size indicator 502 or 503. As illustrated, the size of message segment L, $L_L$, is less than the fixed size, $L_{F1}$, $L_{F2}$, and $L_{F3}$. In operation, as receiver 53 decodes the first message segment, message segment S, it decodes the progression indicator bit within embedded size indicator 502. The progression indicator bit indicates to transmitter 53 that there is a next message segment, message segment S+1, in the sequence. When receiver 53 decodes the second message segment, message segment S+1, it also decodes another progression indicator bit within embedded size indicator 503. The progression indicator bit indicates to receiver 53 that another segment exists, message segment L, in the message sequence. The length, LL, of message segment L, may also be indicated in either or both of message segments 502 and 503.

In an additional aspect illustrated in FIG. 5B, with use of a progression indicator bit, while the data to be included in each message segment of the sequence may not be equal, padding, such as zero padding, may be added to the message segments in order to equalize the segment sizes. For example, zero padding 504 may be added to the last message segment, message segment L, in order to equalize the size, $L_L$, of message segment L, with the fixed size, $L_{F1}=L_{F2}$, of message segments S and S+1. In an additional example, zero padding, such as zero padding 505, may be added to message segment S+1, in order to equalize length $L_{F2}$ with the length, $L_{F1}$, of message segment S.

Various aspects of the present disclosure may be illustrated in FIGS. 5A and 5B. In one beneficial aspect. All message segments are configured to be equally-sized except for the final segment, which may be either larger or smaller, within a predetermined amount of bits, than the fixed size. Thus, $L_{F1}=L_{F2}$, where $L_L$ may be slightly less than or greater than $L_{F1}$ and $L_{F2}$. This example aspect reduces the total possible number of sizes or lengths for the first segment to only one, which may reduce the number of blind decoding hypotheses that a compatible receiver may perform initially.

In various aspects of the present disclosure, a message segment is a self-sufficient piece of payload for the purpose of signaling. The message itself can be of various sizes, as in various numbers of bits. One example aspect of the present disclosure provides for only one possible size for the first message segment of any sequence of message segments. A binary tree may be used to represent such a design. When determining the decoding hypotheses, a receiver may use a conceptual binary tree design in memory to formulate decoding hypotheses for any given message within a sequence of messages.

Figure 6:
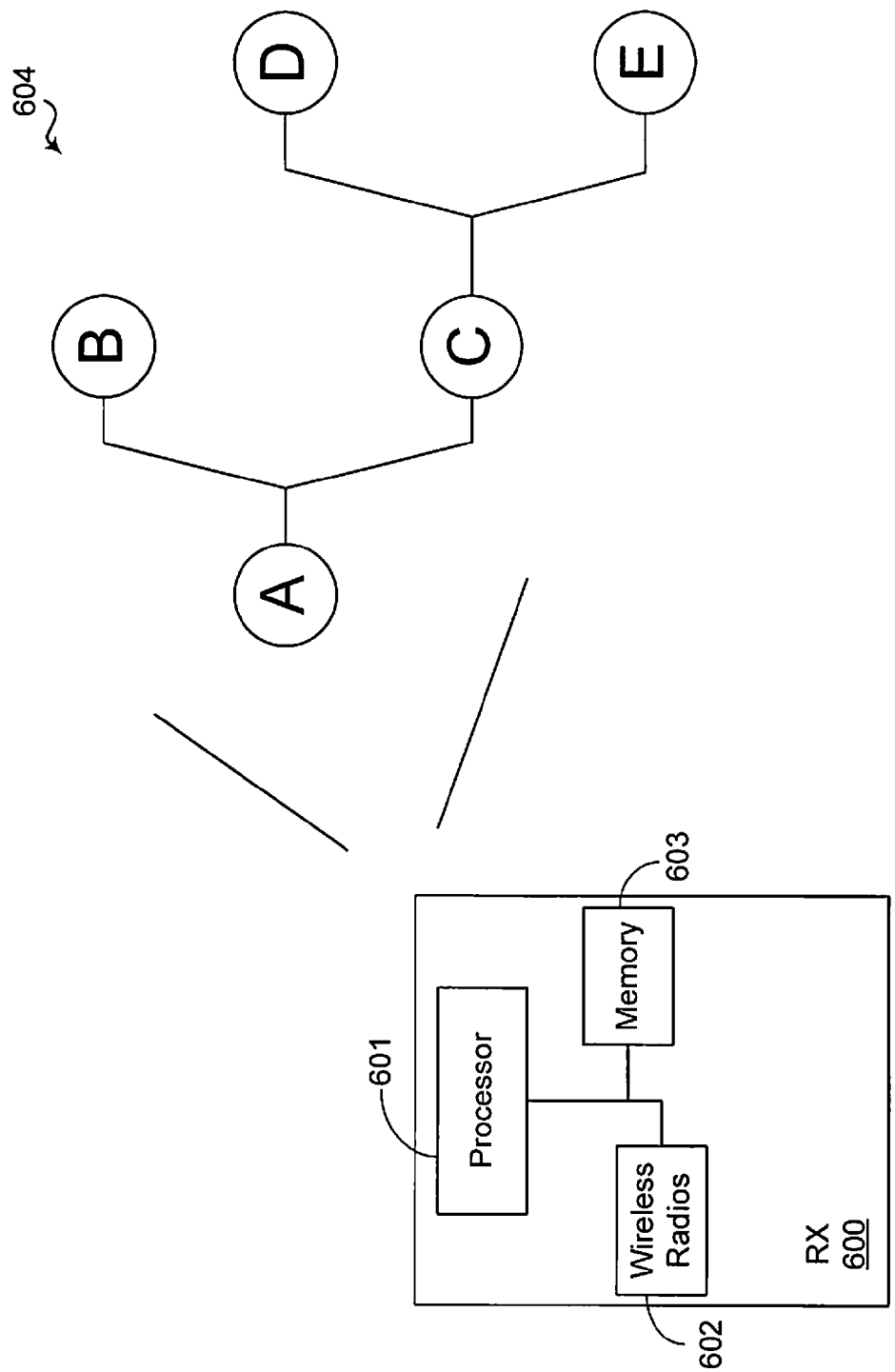
FIG. 6 is a block diagram illustrating a receiver 600 configured according to one aspect of the present disclosure.

FIG. 6 is a block diagram illustrating a receiver 600 configured according to one aspect of the present disclosure. Receiver 600 includes a processor 601, wireless radios 602, and memory 603. Various features and functionalities of receiver 600 are defined through logic, stored on memory 603. Under control of processor 601, the logic is executed creating the operation environment to implement the features and functionalities, which may use and control wireless radios 603, under control of processor 601. Receiver 600 may generate, in memory 603, a binary tree, such as binary tree 604, to use with formulating decoding hypotheses for incoming messages. Each node, A-E, in binary tree 604 represents a payload or codeword segment. Any branch starting from the root node A to any non-root node B-E in binary tree 604 is a valid representation of a message. Various branches in binary tree 604 represent various lengths of messages. Receiver 600, which is configured with CPD, decodes a message starting from root node A, and conditionally and progressively decoding each successive message corresponding toward the ending node of the tree according to the size and/or progression information embedded in the message or messages.

In one aspect, in which the number of segments in the sequence of message segments and the final segment size are specified in embedded size information in the first segment, as soon as receiver 600 decodes the first segment, represented by node A, receiver 600 can determine the exact branch to decode in binary tree 604. For example, after decoding the message segment associated with node A, receiver 600 knows that the message length corresponds to an ending at node D. Because receiver 600 knows that the decoding path is to node D, receiver 600 determines that the branches, A-B, and A-C-E are invalid candidate decoding paths and may prune those potential decoding hypotheses from the total number of decoding hypotheses.

The various aspects of the present disclosure may provide for a significant reduction in the number of blind decode hypotheses and, thus, reduction in decoding complexity or latency. This is particularly helpful in null-hypothesis dominant scenarios, such as PDCCH. The various aspects may also support variable or arbitrary-length control signaling decoding, such as decoding of variable-length DCI, UCI, and the like. The ability to support variable or arbitrary length control signaling may be useful in handling high-priority users, higher number carrier CA implementations, and the like, where the multi-level scheduling priority information for all users can be dynamically specified and variable or arbitrary-length control signaling for dedicated users may be used. Existing implementations provide little or no support for such variable or arbitrary-length codeword decoding, as, for example, in current LTE specifications, PDCCH allocation types 0/1/2 are all fixed-length.

Figure 7:
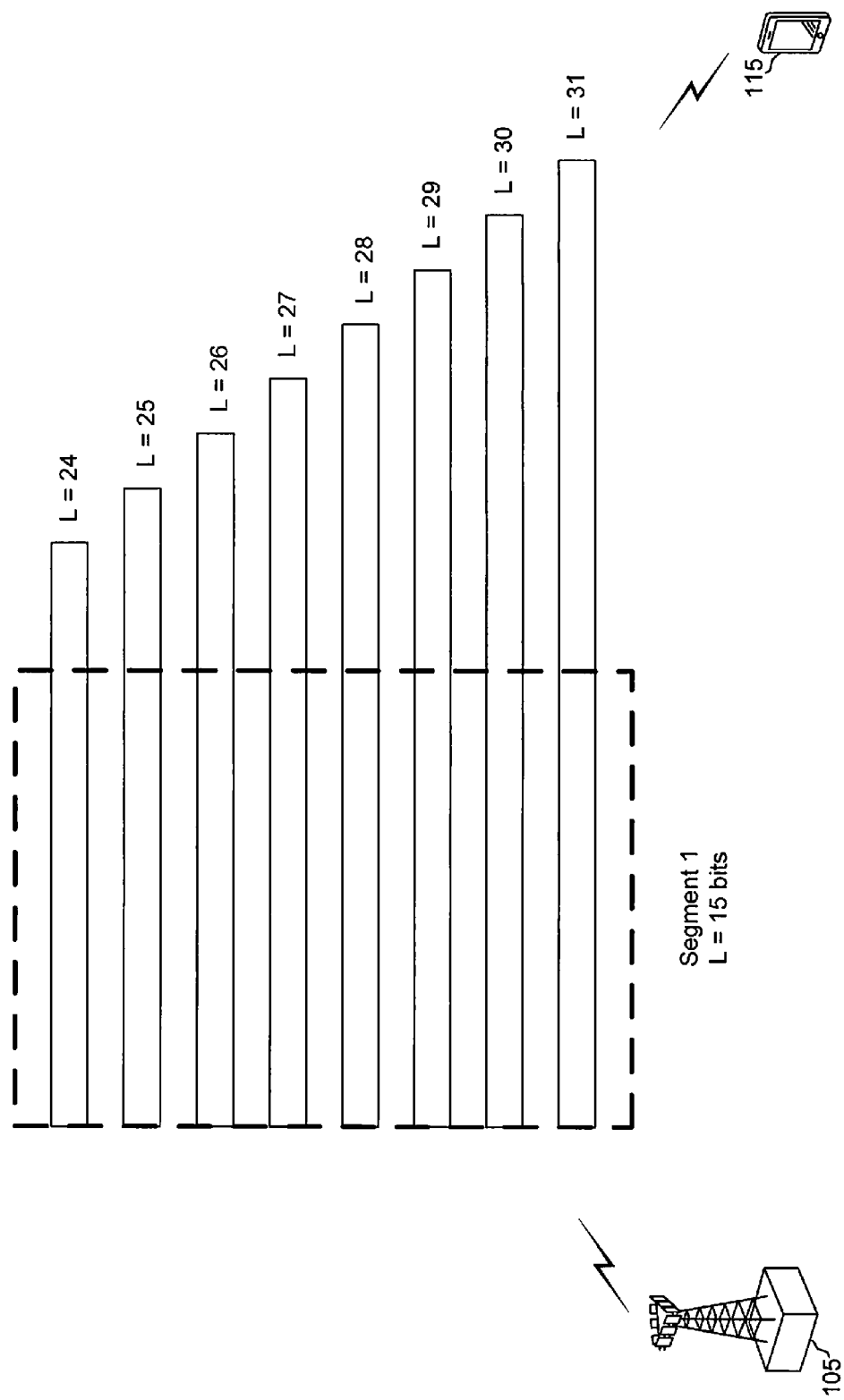
FIG. 7 is a block diagram illustrating a base station and UE configured according to one aspect of the present disclosure.

FIG. 7 is a block diagram illustrating base station 105 and UE 115 configured according to one aspect of the present disclosure. When acting as a transmitter, base station 105 and UE 115, respectively, provide CPS of messages according to various aspects of the present disclosure, while, when acting as a receiver, UE 115 and base station 105, respectively, provide CPD of messages according to various aspects of the present disclosure. As illustrated, there are eight possible lengths for a message defined, L=24 to L=31 bits. According to existing functionality, if base station 105 transmitted a message of one of the eight possible lengths, as the receiver, UE 115 would perform eight separate full-length blind decodes in order to determine whether a user signal is present in the transmission length. However, according to aspects of the present disclosure, when base station 105 performs CPS on messages for transmission to UE 115, and UE performs CPD of the received sequence of messages from base station 105, UE 115, as a CPD receiver, would only require a single segment-length blind decode in order to determine that a user signal is not present.

The fixed-length segment illustrated in FIG. 7 is 15 bits. Because a message sent by base station 105 using CPS will be divided into a sequence of message segments in which the first segments will have a fixed-length of 15 bits, UE 105, therefore, only needs a single decoding hypothesis for a message of a 15 bit length. If no user message is present, UE 105 may stop any further decoding attempts. However, if a user message is detected within the first 15 bit message segment, UE 105, again, only needs another single decoding hypothesis for a second message segment. UE 105 may have received message length information in the first message segment, so UE 105 will know what remaining length will be used. Thus, even with support of the variable or arbitrary length signaling, the number of total decoding hypotheses is dramatically reduced, thereby saving decoding complexity.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The functional blocks and modules in FIGS. 5-7 may comprise processors, electronics devices, hardware devices, electronics components, logical circuits, memories, software codes, firmware codes, etc., or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C) or any of these in any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication, comprising:
   receiving a plurality of encoded message segments;
   receiving an embedded size indicator, wherein the embedded size indicator indicates one or more of: a total size of the plurality of encoded message segments, or existence of a next encoded message segment after a current encoded message segment;
   representing each of a plurality of decoding hypotheses of the plurality of encoded message segments as a binary tree, wherein a plurality of branches in the binary tree represent various total sizes of the plurality of encoded message segments;
   sequentially decoding the plurality of encoded message segments toward an ending node of the binary tree based on the received embedded size indicator, wherein decoding the next encoded message segment of the plurality of encoded message segments is triggered by successfully decoding the current encoded message segment of the plurality; and
   discarding all decoded and partially decoded segments of the plurality of encoded message segments, when the decoding the current encoded message segment fails.

2. The method of claim 1, wherein a control message of the plurality of encoded message segments is configured as a fixed size.

3. The method of claim 1, wherein more than one of the plurality of encoded message segments are received in parallel.

4. The method of claim 1, wherein the embedded size indicator further includes at least one of:
   a size of a final segment of the plurality of encoded message segments, wherein each of the plurality of encoded message segments before the final segment is configured as a fixed size; or
   a size of the next encoded message segment.

5. The method of claim 4, wherein the size of the final segment is one of:
   larger or smaller, than the fixed size within a predetermined threshold of the fixed size.

6. The method of claim 4, wherein the plurality of encoded message segments is configured with a variable-size final segment and each of the plurality of encoded message segments before the final segment as fixed-size segments, the method further including:
   successfully decoding a first message segment of the plurality of encoded message segments; and
   pruning, in response to successfully decoding the first message segment, one or more invalid decoding hypotheses of the plurality of decoding hypotheses in the binary tree based, at least in part, on the embedded size indicator.

7. A method of wireless communication, comprising:
   dividing a message for transmission into a sequence of message segments;
   independently generating an error detection code for each message segment of the sequence of message segments;
   incorporating an embedded size indicator into one or more message segments of the sequence of message segments, wherein the embedded size indicator indicates one or more of: a total size of the sequence of message segments or existence of a next message segment after a current message segment;
   independently encoding each message segment into a codeword segment;

multiplexing the codeword segments for the sequence of message segments over a spectral space of a plurality of subcarriers for transmission; and transmitting each codeword segment for the sequence of message segments to be progressively and conditionally decoded based on the embedded size indicator, wherein decoding hypotheses of the codeword segments are represented as a binary tree that has a plurality of branches representing various total sizes of the sequence of message segments.

8. The method of claim 7, wherein a control message of the sequence of message segments is configured as a fixed size codeword segment.

9. The method of claim 7, wherein the embedded size indicator further includes at least one of:
  a size of a final segment of the sequence of message segments, wherein each of the sequence of message segments before the final segment is configured as a fixed size; or
  a size of the next encoded message segment.

10. The method of claim 9, wherein the size of the final segment is one of: larger or smaller, than the fixed size within a predetermined threshold of the fixed size.

11. An apparatus configured for wireless communication, comprising:
  means for receiving a plurality of encoded message segments;
  means for receiving an embedded size indicator, wherein the embedded size indicator indicates one or more of: a total size of the plurality of encoded message segments, or existence of a next encoded message segment after a current encoded message segment,
  means for representing each of a plurality of decoding hypotheses of the plurality of encoded message segments as a binary tree, wherein a plurality of branches in the binary tree represent various total sizes of the plurality of encoded message segments;
  means for sequentially decoding the plurality of encoded message segments toward an ending node of the binary tree based on the received embedded size indicator, wherein decoding the next encoded message segment of the plurality of encoded message segments is triggered by successfully decoding the current encoded message segment of the plurality; and
  means for discarding all decoded and partially decoded segments of the plurality of encoded message segments, when the decoding the current encoded message segment fails.

12. The apparatus of claim 11, wherein a control message of the plurality of encoded message segments is configured as a fixed size.

13. The apparatus of claim 11, wherein more than one of the plurality of encoded message segments are received in parallel.

14. The apparatus of claim 11, wherein the embedded size indicator further includes at least one of:
  a size of a final segment of the plurality of encoded message segments, wherein each of the plurality of encoded message segments before the final segment is configured as a fixed size; or
  a size of the next encoded message segment.

15. The apparatus of claim 14, wherein the size of the final segment is one of: larger or smaller, than the fixed size within a predetermined threshold of the fixed size.

16. The apparatus of claim 14, wherein the plurality of encoded message segments is configured with a variable-size final segment and each of the plurality of encoded message segments before the final segment as fixed-size segments, the apparatus further including:
  means for successfully decoding a first message segment of the plurality of encoded message segments; and
  means for pruning, in response to successfully decoding the first message segment, one or more invalid decoding hypotheses of the plurality of decoding hypotheses in the binary tree based, at least in part, on the embedded size indicator.

17. An apparatus configured for wireless communication, comprising:
  means for dividing a message for transmission into a sequence of message segments;
  means for incorporating an embedded size indicator into one or more message segments of the sequence of message segments, wherein the embedded size indicator indicates one or more of: a total size of the sequence of message segments or existence of a next message segment after a current message segment;
  means for independently generating an error detection code for each message segment of the sequence of message segments;
  means for independently encoding each message segment into a codeword segment;
  means for multiplexing the codeword segments for the sequence of message segments over a spectral space of a plurality of subcarriers for transmission; and
  means for transmitting each codeword segment for the sequence of message segments to be progressively and conditionally decoded based on the embedded size indicator, wherein decoding hypotheses of the codeword segments are represented as a binary tree that has a plurality of branches representing various total sizes of the sequence of message segments.

18. The apparatus of claim 17, wherein a control message of the sequence of message segments is configured as a fixed size codeword segment.

19. The apparatus of claim 17, wherein the embedded size indicator further includes at least one of:
  a size of a final segment of the sequence of message segments, wherein each of the sequence of message segments before the final segment is configured as a fixed size; or
  a size of the next encoded message segment.

20. The apparatus of claim 19, wherein the size of the final segment is one of: larger or smaller, than the fixed size within a predetermined threshold of the fixed size.

21. A non-transitory computer-readable medium having program code recorded thereon, the program code comprising:
  program code for causing a computer to receive a plurality of encoded message segments;
  program code for causing a computer to receive an embedded size indicator, wherein the embedded size indicator indicates one or more of: a total size of the plurality of encoded message segments, or existence of a next encoded message segment after a current encoded message segment;
  program code for causing a computer to represent each of a plurality of decoding hypotheses of the plurality of encoded message segments as a binary tree, wherein a plurality of branches in the binary tree represent various total sizes of the plurality of encoded message segments;
  program code for causing the computer to sequentially decode the plurality of encoded message segments toward an ending node of the binary tree based on the received embedded size indicator, wherein decoding the next encoded message segment of the plurality of encoded message segments is triggered by successfully decoding the current encoded message segment of the plurality; and program code for causing the computer to discard all decoded and partially decoded segments of the plurality of encoded message segments, when the decoding the current encoded message segment fails.

22. The non-transitory computer-readable medium of claim 21, wherein a control message of the plurality of encoded message segments is configured as a fixed size.

23. The non-transitory computer-readable medium of claim 21, wherein more than one of the plurality of encoded message segments are received in parallel.

24. The non-transitory computer-readable medium of claim 21, wherein the embedded size indicator further includes at least one of:
a size of a final segment of the plurality of encoded message segments, wherein each of the plurality of encoded message segments before the final segment is configured as a fixed size; or
a size of the next encoded message segment.

25. The non-transitory computer-readable medium of claim 24, wherein the size of the final segment is one of: larger or smaller, than the fixed size within a predetermined threshold of the fixed size.

26. The non-transitory computer-readable medium of claim 24, wherein the plurality of encoded message segments is configured with a variable-size final segment and each of the plurality of encoded message segments before the final segment as fixed-size segments, the program code further including:
program code for causing the computer to successfully decode a first message segment of the plurality of encoded message segments; and
program code for causing the computer to prune, in response to successfully decoding the first message segment, one or more invalid decoding hypotheses of the plurality of decoding hypotheses in the binary tree based, at least in part, on the embedded size indicator.

27. A non-transitory computer-readable medium having program code recorded thereon, the program code comprising:
program code for causing a computer to divide a message for transmission into a sequence of message segments;
program code for causing the computer to independently generate an error detection code for each message segment of the sequence of message segments;
program code for causing the computer to incorporate an embedded size indicator into one or more message segments of the sequence of message segments, wherein the embedded size indicator indicates one or more of: a total size of the sequence of message segments or existence of a next message segment after a current message segment;
program code for causing the computer to independently encode each message segment into a codeword segment;
program code for causing the computer to multiplex the codeword segments for the sequence of message segments over a spectral space of a plurality of subcarriers for transmission; and
program code for causing the computer to transmit each codeword segment for the sequence of message segments to be progressively and conditionally decoded based on the embedded size indicator, wherein decoding hypotheses of the codeword segments are represented as a binary tree that has a plurality of branches representing various total sizes of the sequence of message segments.

28. The non-transitory computer-readable medium of claim 27, wherein a control message of the sequence of message segments is configured as a fixed size codeword segment.

29. The non-transitory computer-readable medium of claim 27, wherein the embedded size indicator further includes at least one of:
a size of a final segment of the sequence of message segments, wherein each of the sequence of message segments before the final segment is configured as a fixed size; or
a size of the next encoded message segment.

30. The non-transitory computer-readable medium of claim 29, wherein the size of the final segment is one of: larger or smaller, than the fixed size within a predetermined threshold of the fixed size.

31. An apparatus configured for wireless communication, the apparatus comprising:
at least one processor; and
a memory coupled to the at least one processor,
wherein the at least one processor is configured:
to receive a plurality of encoded message segments;
to receive an embedded size indicator, wherein the embedded size indicator indicates one or more of: a total size of the plurality of encoded message segments, or existence of a next encoded message segment after a current encoded message segment;
to represent each of a plurality of decoding hypotheses of the plurality of encoded message segments as a binary tree, wherein a plurality of branches in the binary tree represent various total sizes of the plurality of encoded message segments;
to sequentially decode the plurality of encoded message segments toward an ending node of the binary tree based on the received embedded size indicator, wherein decoding the next encoded message segment of the plurality of encoded message segments is triggered by successfully decoding the current encoded message segment of the plurality; and
to discard all decoded and partially decoded segments of the plurality of encoded message segments, when the decoding the current encoded message segment fails.

32. The apparatus of claim 31, wherein a control message of the plurality of encoded message segments is configured as a fixed size.

33. The apparatus of claim 31, wherein more than one of the plurality of encoded message segments are received in parallel.

34. The apparatus of claim 31, wherein the embedded size indicator further includes at least one of:
a size of a final segment of the plurality of encoded message segments, wherein each of the plurality of encoded message segments before the final segment is configured as a fixed size; or
a size of the next encoded message segment.

35. The apparatus of claim 34, wherein the size of the final segment is one of: larger or smaller, than the fixed size within a predetermined threshold of the fixed size.

36. The apparatus of claim 34, wherein the plurality of encoded message segments is configured with a variable-size final segment and each of the plurality of encoded message segments before the final segment as fixed-size segments, the apparatus further including configuration of the at least one processor:
  to successfully decode a first message segment of the plurality of encoded message segments; and
  to prune, in response to successfully decoding the first message segment, one or more invalid decoding hypotheses of the plurality of decoding hypotheses in the binary tree based, at least in part, on the embedded size indicator.

37. An apparatus configured for wireless communication, the apparatus comprising:
  at least one processor; and
  a memory coupled to the at least one processor,
  wherein the at least one processor is configured:
    to divide a message for transmission into a sequence of message segments;
    to independently generate an error detection code for each message segment of the sequence of message segments;
    to incorporate an embedded size indicator into one or more message segments of the sequence of message segments, wherein the embedded size indicator indicates one or more of: a total size of the sequence of message segments or existence of a next message segment after a current message segment;
    to independently encode each message segment into a codeword segment;
    to multiplex the codeword segments for the sequence of message segments over a spectral space of a plurality of subcarriers for transmission; and
    to transmit each codeword segment for the sequence of message segments to be progressively and conditionally decoded based on the embedded size indicator, wherein decoding hypotheses of the codeword segments are represented as a binary tree that has a plurality of branches representing various total sizes of the sequence of message segments.

38. The apparatus of claim 37, wherein a control message of the sequence of message segments is configured as a fixed size codeword segment.

39. The apparatus of claim 37, wherein the embedded size indicator further includes at least one of:
  a size of a final segment of the sequence of message segments, wherein each of the sequence of message segments before the final segment is configured as a fixed size; or
  a size of the next encoded message segment
  a progression indication identifying existence of the next encoded message segment.

40. The apparatus of claim 39, wherein the size of the final segment is one of: larger or smaller, than the fixed size within a predetermined threshold of the fixed size.

* * * * *